(12) United States Patent
Safran, Sr.

(10) Patent No.: US 6,685,476 B1
(45) Date of Patent: Feb. 3, 2004

(54) COMPUTER-BASED EDUCATIONAL LEARNING

(76) Inventor: Robert L. Safran, Sr., 203 Elmwood Blvd., York, PA (US) 17403

( * ) Notice: Subject to any disclaimer, the term of this patent is extended or adjusted under 35 U.S.C. 154(b) by 0 days.

(21) Appl. No.: 09/577,735

(22) Filed: May 23, 2000

(51) Int. Cl.⁷ .................................................. G09B 7/00
(52) U.S. Cl. ....................... 434/169; 434/170; 434/335; 434/362
(58) Field of Search ................................ 434/118, 156, 434/167, 169, 170, 322, 323, 327, 335, 344, 353–362

(56) References Cited

U.S. PATENT DOCUMENTS

| | | | |
|---|---|---|---|
| 3,922,799 A | 12/1975 | Tanji | |
| 4,968,257 A | 11/1990 | Yalen | 434/308 |
| 5,218,537 A | 6/1993 | Hemphill et al. | 364/419 |
| 5,820,386 A | 10/1998 | Sheppard, II | 434/322 |
| 5,822,720 A | 10/1998 | Bookman et al. | 704/3 |
| 5,904,485 A | 5/1999 | Siefert | |
| 5,947,747 A | 9/1999 | Walker et al. | 434/354 |
| 5,967,793 A | 10/1999 | Ho et al. | |
| 6,181,910 B1 * | 1/2001 | Jerrold-Jones et al. | 434/353 |
| 6,302,698 B1 * | 10/2001 | Ziv-El | 434/323 |
| 6,411,796 B1 * | 6/2002 | Remschel | 434/350 |

FOREIGN PATENT DOCUMENTS

| | | | |
|---|---|---|---|
| EP | 0953935 A2 | 3/1999 | G09B/19/06 |
| GB | 2127201 A | 12/1983 | |
| WO | WO 99/60546 | 11/1999 | |
| WO | WO 00/14700 | 3/2000 | G06B/7/04 |

* cited by examiner

*Primary Examiner*—John Edmund Rovnak
(74) *Attorney, Agent, or Firm*—Kurt L. Ehresman; Brian T. Sattizahn; McNees Wallace & Nurick LLC

(57) ABSTRACT

Methods and programs are disclosed for a computer-based teaching method for various subjects, including grammar. The program includes one or more lessons to test a student's skills relative to a particular subject. A database with coded information allows a computer to search the information, such as sentences and word functions provided therein. A guide for identifying the appropriate code for each respective lesson is provided such that as a student progresses through the lessons, the computer searches the database to provide the appropriate information to the student based upon the code of the information and the guide for the respective lesson. Further, the method of coding answers to a test given with the use of a computer program is discussed. Answers given by a student are compared to the correct answers located in a computer database. The program visually indicates correct answers in a first color and incorrect answers in a second color, whereby the color coding of the answers provides an easily detectable and effective means for the student and an instructor to recognize any problems the user may be having in determining the correct answers. Also, a method of coding sentences for use in an educational computer program to teach grammar is disclosed. A numeric code is created for each word function that can be used in a sentence. A respective sentence is reviewed to determine how each word functions in the structure of the sentence. Once reviewed, an appropriate numeric code is assigned to each respective word function used in the sentence, with the numeric code being entered into a database. The numeric code can be read and searched by the computer to allow the computer to recall appropriate sentences for each lesson in the education computer program.

10 Claims, 17 Drawing Sheets

Help Lesson Menu  Lesson Intro  Points to Remember  Tutorial Instructions  Tutorial Exercise  Practice to Mastery

Lesson 1: NOUN SUBJECTS
Tutorial Instructions

Now that you have reviewed the Points to Remember for Lesson 1, let's practice identifying one-word nouns and compound-word nouns that function as subjects. As each new sentence appears, read the sentence to determine the one-word noun or compound-word noun that functions as the subject. Once you have identified the subject, do the following: (1) click on the word-function code that identifies the type of subject—select the code NS for a one-word noun subject or the code CNS for each word of a compound-word noun subject, (2) click on your selected code above the word(s) that you wish to identify as the subject, and (3) click on the Check Answer button. If both your word-function code selection and the word(s) you selected as the subject are correct, the message: WELL DONE! Will appear. If either your word-function code selection or word selection is incorrect, this message will appear. INCORRECT! REMOVE INCORRECT OR MISPLACED CODE(S) WITH A RIGHT CLICK, AND TRY AGAIN.

Note: For a complete explanation of the Tutorial Exercise procedures, click the Help button; then click Tutorial Exercise Procedures.

| QUIT | ◀Previous Screen | Exercises▶ |

| Help Lesson Menu Lesson Intro Points to Remember Tutorial Instructions Tutorial Exercise Practice to Mastery |

22 → Subject | Verb | Direct Object | Adjective | Adverb | Preposition | Object of Preposition | Predicate Nominative | Predicate Adjective | Indirect Object | Appositive | Verbal Complement | Conjunction | Clause | Sentence

NS \ CNS \ PNS \ PNU \ GS \ IS \ RPS

Lesson 1: Sentence 1

24 → --- The new secretary has a pleasant disposition.

29

Check Answer

Instruction

26 → IDENTIFY BY CODE THE WORD(S) THAT FUNCTIONS AS THE SUBJECT.

28 → (Ask WHO? WHAT? OR WHOM? questions to determine the subject.)

<u>20</u>   QUIT

Figure 4

REQUIRED SCREENS AND CODES

TUTORIAL EXERCISE NO. 5

| Sentence number | Screen number | Number of codes | Code number | Screen number | Number of codes | Code number | Screen number | Correct Number | Screen number | Number of codes | Code number | Screen number | Number of codes | Code number | Screen number | Correct Number | Screen number | Number of codes | Code number | Code number | Total codes |
|---|---|---|---|---|---|---|---|---|---|---|---|---|---|---|---|---|---|---|---|---|---|
| 1 | 1A | 1 | 1 | 4B | 1 | 7 | 5 | 0 | 0 | 0 | 0 | 7A | 1 | 9 | 20A | 3 | 21A-3 | 3 | 12 | | 6 |
| 2 | 1A | 1 | 1 | 4B | 1 | 7 | 5 | 0 | 0 | 0 | 0 | 7A | 1 | 9 | 20A | 4 | 21A-4 | 4 | 12 | | 7 |
| 3 | 1A | 1 | 3 | 4B | 1 | 7 | 5 | 0 | 0 | 0 | 0 | 7A | 1 | 9 | 20A | 2 | 21A-2 | 2 | 12 | | 5 |
| 4 | 1A | 1 | 1 | 4B | 1 | 7 | 5 | 0 | 0 | 0 | 0 | 7A | 1 | 9 | 20A | 2 | 21A-2 | 2 | 12 | | 5 |
| 5 | 1A | 1 | 3 | 4B | 1 | 7 | 5 | 2 | 6B | 2 | 6 | 7A | 1 | 9 | 20A | 2 | 21A-2 | 2 | 12 | | 7 |
| 6 | 1A | 1 | 1 | 4B | 1 | 7 | 5 | 1 | 6A | 1 | 6 | 7A | 1 | 9 | 20A | 3 | 21A-3 | 3 | 12 | | 7 |
| 7 | 1A | 1 | 3 | 4B | 1 | 7 | 5 | 1 | 6A | 1 | 6 | 7A | 1 | 9 | 20A | 1 | 21A-1 | 1 | 12 | | 5 |
| 8 | 1A | 3 | 2 | 4B | 1 | 7 | 5 | 0 | 0 | 0 | 0 | 7A | 1 | 9 | 20A | 1 | 21A-1 | 1 | 12 | | 6 |
| 9 | 1A | 1 | 1 | 4B | 1 | 7 | 5 | 0 | 0 | 0 | 0 | 7A | 1 | 9 | 20A | 2 | 21A-2 | 2 | 12 | | 5 |
| 10 | 1A | 1 | 1 | 4B | 1 | 7 | 5 | 0 | 0 | 0 | 0 | 0 | 0 | 9 | 20A | 4 | 21A-4 | 4 | 12=2 | 13=2 | 6 |
| 11 | 1A | 1 | 1 | 4B | 1 | 7 | 5 | 0 | 0 | 0 | 0 | 7A | 1 | 9 | 20A | 6 | 21A-6 | 6 | 12=4 | 13=2 | 9 |
| 12 | 1A | 1 | 4 | 4B | 1 | 7 | 5 | 0 | 0 | 0 | 0 | 7A | 1 | 9 | 20A | 4 | 21A-4 | 4 | 12 | | 7 |
| 13 | 1A | 1 | 1 | 4B | 1 | 7 | 5 | 0 | 0 | 0 | 0 | 7A | 1 | 9 | 20A | 4 | 21A-4 | 4 | 12=2 | 13=2 | 7 |
| 14 | 1A | 3 | 2 | 4B | 1 | 7 | 5 | 0 | 0 | 0 | 0 | 7A | 1 | 9 | 20A | 3 | 21A-3 | 3 | 12 | | 6 |
| 15 | 1A | 1 | 1 | 4B | 1 | 7 | 5 | 0 | 0 | 0 | 0 | 7A | 1 | 9 | 20A | 1 | 21A-1 | 1 | 12 | | 5 |
| 16 | 1A | 1 | 2 | 4B | 1 | 7 | 5 | 0 | 0 | 0 | 0 | 7A | 1 | 9 | 20A | 3 | 21A-3 | 3 | 12=1 | 13=2 | 6 |
| 17 | 1A | 1 | 1 | 4B | 1 | 7 | 5 | 0 | 0 | 0 | 0 | 7A | 1 | 9 | 20A | 2 | 21A-2 | 2 | 12 | | 5 |
| 18 | 1A | 2 | 2 | 4B | 1 | 7 | 5 | 0 | 0 | 0 | 0 | 7A | 1 | 9 | 20A | 2 | 21A-2 | 2 | 12 | | 6 |
| 19 | 1A | 1 | 1 | 4B | 1 | 7 | 5 | 0 | 0 | 0 | 0 | 7A | 1 | 9 | 20A | 3 | 21A-3 | 3 | 12 | | 5 |
| 20 | 1A | 1 | 4 | 4B | 1 | 7 | 5 | 0 | 0 | 0 | 0 | 7A | 1 | 9 | 20A | 2 | 21A-2 | 2 | 12 | | 5 |
| 21 | 1A | 1 | 1 | 4B | 1 | 7 | 5 | 0 | 0 | 0 | 0 | 7A | 1 | 9 | 20A | 2 | 21A-2 | 2 | 12 | | 5 |
| 22 | 1A | 1 | 1 | 4B | 1 | 7 | 5 | 0 | 0 | 0 | 0 | 7A | 1 | 9 | 20A | 3 | 21A-3 | 3 | 12 | | 6 |
| 23 | 1A | 1 | 1 | 4B | 1 | 7 | 5 | 0 | 0 | 0 | 0 | 7A | 1 | 9 | 20A | 3 | 21A-3 | 3 | 12 | | 5 |
| 24 | 1A | 1 | 1 | 4B | 1 | 7 | 5 | 0 | 0 | 0 | 0 | 7A | 1 | 9 | 20A | 5 | 21A-5 | 5 | 12=3 | 13=2 | 8 |
| 25 | 1A | 1 | 1 | 4B | 1 | 7 | 5 | 0 | 0 | 0 | 0 | 7A | 3 | 10 | 20A | 2 | 21A-2 | 2 | 12 | | 7 |

FIGURE 5

| Help | Lesson Menu | Lesson Intro | Points to Remember | Tutorial Instructions | Tutorial Exercise | Practice to Mastery |

32 →  Subject | Verb | Direct Object | Adjective | Adverb | Preposition | Object of Preposition | Predicate Nominative | Predicate Adjective | Indirect Object | Appositive | Verbal Complement | Conjunction | Clause | Sentence

34 →

Sentence #97        Lesson 5: Sentence 1

Counselors offer beneficial information.

| 40↓ | 42↓ | 42↓ | 43↓ | 44↓ | 45↓ |
| Grade Me | New Sentence | Review | ◀Back | Forward▶ | Progress Review |

Instruction

36 → IDENTIFY BY WORD-FUNCTION CODE HOW EACH WORD FUNCTIONS IN THIS SENTENCE, AND THEN CLICK THE "GRADE ME" BUTTON.

<u>25</u>

Correct 1$^{st}$ Attempts: 0    Consecutive 1$^{st}$ Attempts: 0    [ QUIT ]

Figure 6

ASSIGNED NUMBERS FOR WORD-FUNCTION AND CLAUSE IDENTIFICATION CODES
AND
ASSIGNED LETTERS FOR SENTENCE-TYPE CODES

| No. | Code | Translation | | No. | Code | Translation |
|---|---|---|---|---|---|---|
| 1 = | NS | Noun Subject | | 36 = | GS | Gerund Subject |
| 2 = | CNS | Compound-word Noun Subject | | 37 = | GDO | Gerund Direct Object |
| 3 = | PNS | Pronoun Subject | | 38 = | GIO | Gerund Indirect Object |
| 4 = | PNU | Pronoun Subject Understood | | 39 = | GOP | Gerund Object of Preposition |
| 5 = | MV | Main Verb | | 40 = | GPN | Gerund Predicate Nominative |
| 6 = | HV | Helping Verb | | 41 = | GNC | Gerund Complement |
| 7 = | MVT | Main Verb Transitive | | 42 = | IS | Infinitive Subject |
| 8 = | MVI | Main Verb Intransitive | | 43 = | IDO | Infinitive Direct Object |
| 9 = | NDO | Noun Direct Object | | 44 = | IPN | Infinitive Predicate Nominative |
| 10 = | CNDO | Compound-word Noun Direct Object | | 45 = | IAJ | Infinitive Adjective |
| 11 = | PNDO | Pronoun Direct Object | | 46 = | IAV | Infinitive Adverb |
| 12 = | AJ | Adjective | | 47 = | IFC | Infinitive Complement |
| 13 = | CAJ | Compound-word Adjective | | 48 = | CC | Coordinating Conjunction |
| 14 = | AV | Adverb | | 49 = | CORC | Correlative Conjunction |
| 15 = | PR | Preposition | | 50 = | SC | Subordinating Conjunction |
| 16 = | CPR | Compound-word Preposition | | 51 = | CSC | Compound-word Subordinating Conjunction |
| 17 = | NOP | Noun Object of Preposition | | | | |
| 18 = | CNOP | Compound-word Noun Object of Preposition | | 52 = | AVC | Adverb Clause |
| 19 = | PNOP | Pronoun Object of Preposition | | 53 = | RPS | Relative Pronoun Subject |
| 20 = | MVL | Main Verb Linking | | 54 = | RPDO | Relative Pronoun Direct Object |
| 21 = | NPN | Noun Predicate Nominative | | 55 = | RPIO | Relative Pronoun Indirect Object |
| 22 = | CNPN | Compound-word Noun Predicate Nominative | | 56 = | RPPN | Relative Pronoun Predicate Nominative |
| 23 = | PNPN | Pronoun Predicate Nominative | | 57 = | RPAJ | Relative Pronoun Adjective |
| 24 = | PAJ | Predicate Adjective | | 58 = | AJC | Adjective Clause |
| 25 = | NIO | Noun Indirect Object | | 59 = | NCS | Noun Clause Subject |
| 26 = | CNIO | Compound-word Noun Indirect Object | | 60 = | NCDO | Noun Clause Direct Object |
| 27 = | PNIO | Pronoun Indirect Object | | 61 = | NCPN | Noun Clause Predicate Nominative |
| 28 = | SAP | Subject Appositive | | 62 = | NCIO | Noun Clause Indirect Object |
| 29 = | DOAP | Direct Object Appositive | | 63 = | NCOP | Noun Clause Object of Preposition |
| 30 = | IOAP | Indirect Object Appositive | | 64 = | IDC | Independent Clause |
| 31 = | PNAP | Predicate Nominative Appositive | | 65 = | IDC-2 | Independent Clause (second) |
| 32 = | OPAP | Object of Preposition Appositive | | | | |
| 33 = | | (No Assigned Code) | | A = | S | Simple Sentence |
| 34 = | PAR | Participle | | B = | CX | Complex Sentence |
| 35 = | PAC | Participle Complement | | C = | CD | Compound Sentence |
| | | | | D = | CDCX | Compound-complex Sentence |

FIGURE 7

PROGRESSION TABLE: REQUIRED ALPHANUMERIC CODES FOR PRACTICE TO MASTERY EXERCISES

| Lesson No. | Lesson Topic | Required W-F Number | Highest W-F Number | Sentence Code |
|---|---|---|---|---|
| 1 | Noun Subjects | 1 or 2 | 24 | A |
| 2 | Pronoun Subjects | 3 or 4 | 32 | A |
| 3 | Main and Helping Verbs | 7 or 8 | 24 | A |
| 4 | Transitive and Intransitive Verbs | 7 or 8 | 19 | A |
| 5 | Adjectives | 12 or 13 | 13 | A |
| 6 | Adverbs | 14 | 14 | A |
| 7 | Prepositions and Objects of Preps | 15 or 16 | 19 | A |
| 8 | Linking Verbs with PN and PAJ | 21,22,23, or 24 | 24 | A |
| 9 | Indirect Objects | 25,26, or 27 | 27 | A |
| 10 | Appositives | 28,29,30,31, or 32 | 32 | A |
| 11 | Participles | 34 | 35 | A |
| 12 | Gerunds | 36,37,38, 39 or 40 | 41 | A |
| 13 | Infinitives | 42,43,44,45 or 46 | 47 | A |
| 14 | Verbal Review | 34 - 47 (any number) | 47 | A |
| 15 | Conjunctions | 48 or 49 | 49 | A |
| 16 | Adverb Clauses | 52 | 52 | B |
| 17 | Adjective Clauses | 58 | 58 | B |
| 18 | Noun Clauses | 59,60,61,62, or 63 | 63 | B |
| 19 | Clause Review | 52-63 (any number) | 63 | B |
| 20 | Sentence Types | (any number) | 65 | A-D |

Figure 8

PROGRESSION TABLE: TOTAL AND TYPE OF CODES FOR SENTENCES IN EACH LESSON

| Lesson No. | Lesson Topic | Subject Codes | Verb Codes | Direct Object Codes | Adjective Codes | Adverb Codes | Preposition Codes | Object of Prep. Codes | Predicate Nominative Codes | Predicate Adjective Codes | Indirect Object Codes | Appositive Codes | Verbal Complement Codes | Conjunction Codes | Clause Codes | Sentence Codes |
|---|---|---|---|---|---|---|---|---|---|---|---|---|---|---|---|---|
| 1 | Noun Subjects | 2 | 0 | 0 | 0 | 0 | 0 | 0 | 0 | 0 | 0 | 0 | 0 | 0 | 0 | 0 |
| 2 | Pronoun Subjects | 4 | 0 | 0 | 0 | 0 | 0 | 0 | 0 | 0 | 0 | 0 | 0 | 0 | 0 | 0 |
| 3 | Main Verbs and Helping Verbs | 4 | 2 | 0 | 0 | 0 | 0 | 0 | 0 | 0 | 0 | 0 | 0 | 0 | 0 | 0 |
| 4 | Transitive and Intransitive Verbs | 4 | 4 | 3 | 0 | 0 | 0 | 0 | 0 | 0 | 0 | 0 | 0 | 0 | 0 | 0 |
| 5 | Adjectives | 4 | 4 | 3 | 2 | 0 | 0 | 0 | 0 | 0 | 0 | 0 | 0 | 0 | 0 | 0 |
| 6 | Adverbs | 4 | 4 | 3 | 2 | 1 | 0 | 0 | 0 | 0 | 0 | 0 | 0 | 0 | 0 | 0 |
| 7 | Prepositions and Objects of Preps. | 4 | 4 | 3 | 2 | 1 | 2 | 3 | 0 | 0 | 0 | 0 | 0 | 0 | 0 | 0 |
| 8 | Linking Verbs with PNs and PAJs | 4 | 5 | 3 | 2 | 1 | 2 | 3 | 3 | 1 | 0 | 0 | 0 | 0 | 0 | 0 |
| 9 | Indirect Objects | 4 | 5 | 3 | 2 | 1 | 2 | 3 | 3 | 1 | 3 | 0 | 0 | 0 | 0 | 0 |
| 10 | Appositives | 4 | 5 | 3 | 2 | 1 | 2 | 3 | 3 | 1 | 3 | 5 | 0 | 0 | 0 | 0 |
| 11 | Participles | 4 | 5 | 3 | 3 | 1 | 2 | 3 | 3 | 1 | 3 | 5 | 1 | 0 | 0 | 0 |
| 12 | Gerunds | 5 | 5 | 4 | 3 | 2 | 2 | 4 | 4 | 1 | 4 | 5 | 2 | 0 | 0 | 0 |
| 13 | Infinitives | 6 | 5 | 5 | 4 | 2 | 2 | 4 | 5 | 1 | 4 | 5 | 3 | 0 | 0 | 0 |
| 14 | Verbal Review | 6 | 5 | 5 | 4 | 2 | 2 | 4 | 5 | 1 | 4 | 5 | 3 | 0 | 0 | 0 |
| 15 | Conjunctions | 6 | 5 | 5 | 4 | 2 | 2 | 4 | 5 | 1 | 4 | 5 | 3 | 2 | 0 | 0 |
| 16 | Adverb Clauses | 6 | 5 | 5 | 4 | 2 | 2 | 4 | 6 | 1 | 4 | 5 | 3 | 4 | 2 | 0 |
| 17 | Adjective Clauses | 7 | 5 | 6 | 5 | 2 | 2 | 4 | 6 | 1 | 5 | 5 | 3 | 4 | 3 | 0 |
| 18 | Noun Clauses | 7 | 5 | 6 | 5 | 2 | 2 | 4 | 6 | 1 | 5 | 5 | 3 | 4 | 8 | 0 |
| 19 | Clause Review | 7 | 5 | 6 | 5 | 2 | 2 | 4 | 6 | 1 | 5 | 5 | 3 | 4 | 8 | 0 |
| 20 | Sentence Types | 7 | 5 | 6 | 5 | 2 | 2 | 4 | 6 | 1 | 5 | 5 | 3 | 4 | 9 | 4 |
| CODE/NUMBER | | NS=1 CNS=2 PNS=3 PNU=4 GS=16 IS=42 RPS=53 | MV=5 HV=6 MVT=7 MVI=8 MVL=20 | NDO=9 CNDO=10 PNDO=11 GDO=17 IDO=43 RPDO=54 | AJ=12 CAJ=13 PAR=34 IAJ=45 RPAJ=57 | AV=14 IAV=46 | PR=15 CPR=16 | NOP=17 CNOP=18 PNOP=19 GOP=39 | NPN=21 CNPN=22 PNPN=23 GPN=40 IPN=44 RPPN=56 | PAJ=24 | NIO=25 CNIO=26 PNIO=27 GIO=38 RPIO=55 | SAP=28 DOAP=29 IOAP=30 PNAP=31 OPAP=32 | PAC=35 GNC=41 IFC=47 | CC=48 CORC=49 SC=50 CSC=51 | IDC=64 AVC=52 AJC=58 NCS=59 NCDO=60 NCPN=61 NCIO=62 NCOP=63 IDC-2=65 | S=A CX=B CD=C CDCX=D |

Help Lesson Menu Lesson Intro Points to Remember Tutorial Instructions Tutorial Exercise Practice to Mastery Subject | Verb | Direct Object | Adjective | Adverb | Preposition | Object of Preposition | Predicate Nominative | Predicate Adjective | Indirect Object | Appositive | Verbal Complement | Conjunction | Clause | Sentence

NDO \ CNDO \ PNDO \ PNU \ GDO \ IDO \ RPDO

Noun Direct Object

34 →

| sentence #70 | | Lesson 5: Sentence 2 |
CNS   CNS   MM   AJ   NDO
Mr.   Ryder   hired   a   receptionist.

40↓        41↓        42↓        43↓        44↓        45↓

| Grade Me | New Sentence | Review | ◀ Back | ▶ Forward | Progress Review |

| Instruction |

36 →

YOU HAVE NOT IDENTIFIED ALL WORDS. GREEN CODES ARE CORRECT RESPONSES, AND RED CODES ARE INCORRECT RESPONSES. REMOVE RED CODES WITH A RIGHT CLICK, AND TRY AGAIN.

Correct 1st Attempts: __1__     Consecutive 1st Attempts: __1__     | QUIT |

Figure 11

Help Lesson Menu Lesson Intro Points to Remember Tutorial Instructions Tutorial Exercise Practice to Mastery

32 →

| Subject | Verb | Direct Object | Adjective | Adverb | Preposition | Object of Preposition | Predicate | Predicate Adjective | Indirect Object | Appositive | Verbal Complement | Conjunction | Clause | Sentence |

AJ \ CAJ \ PAR \ IAJ \ RPAJ

34 → sentence #123     Lesson 5: Sentence 1

AJ     NS     MVT     AJ     NDO
Special guidelines provided basic information.

40↓     41↓     42↓     43↓     44↓     45↓

| Grade Me | New Sentence | Review | ◀Back | ▶Forward | Progress Review |

Instruction

36 →
YOU HAVE NOT IDENTIFIED ALL WORDS ON YOUR SECOND ATTEMPT. GREEN CODES ARE CORRECT FIRST ATTEMPT RESPONSES, YELLOW CODES ARE CORRECT SECOND ATTEMPT RESPONSES, AND RED CODES ARE THE CORRECT CODES FOR WORDS NOT IDENTIFIED.

*Click "New Sentence" for your next attempt or "Progress Review" to review your current progress.*

Correct 1st Attempts: __0__     Consecutive 1st Attempts: __0__     QUIT

Figure 12

Progress Review

Total Attempts:     3

Number of Correct First Attempts:     1

Number of Correct Second Attempts:     1

Number of Sentences with Words not Identified:     1

Consecutive Number of Correct First Attempts:     0

Your goal is to correctly identify (on your first attempt) how all words function in 25 sentences with 10 consecutive first-attempt responses in a row.

Back

Figure 13

| E-GUMPP GRAMMAR MASTERY TEST RESULTS FOR Guest User ||||
|---|---|---|---|
| GRAMMAR MASTERY TEST TOTAL SUMMARY ||||
| Code Type | Total Number | Number Identified | Percent Correct |
| I. W-F Codes | 253 | 234 | 92% |
| II. C-I Codes | 253 | 227 | 89% |
| III. Sentence Codes | 25 | 24 | 96% |

E-GUMPP GRAMMAR MASTERY TEST RESULTS FOR Guest User

I. Word-function identification

| Word-function Code | Total Number | Number Identified | Percent Correct |
|---|---|---|---|
| NS | 17 | 17 | 100% |
| CNS | 2 | 2 | 100% |
| PNS | 19 | 17 | 89% |
| HV | 12 | 12 | 100% |
| MVT | 15 | 14 | 93% |
| MVI | 11 | 10 | 90% |
| NDO | 9 | 9 | 100% |
| CNDO | 0 | 0 | n/a |
| PNDO | 1 | 1 | 100% |
| AJ | 54 | 53 | 98% |
| CAJ | 2 | 2 | 100% |

E-GUMPP GRAMMAR MASTERY TEST RESULTS FOR Guest User
I. Word-function identification (cont.)

| Word-function Code | Total Number | Number Identified | Percent Correct |
|---|---|---|---|
| AV | 7 | 6 | 85% |
| PR | 19 | 19 | 100% |
| CPR | 0 | 0 | n/a |
| NOP | 15 | 12 | 80% |
| CNOP | 5 | 5 | 100% |
| PNOP | 0 | 0 | n/a |
| MVL | 16 | 15 | 93% |
| NPN | 3 | 3 | 100% |
| CNPN | 3 | 3 | 100% |
| PNPN | 0 | 0 | n/a |
| PAJ | 10 | 9 | 90% |

E-GUMPP GRAMMAR MASTERY TEST RESULTS FOR Guest User
I. Word-function identification (cont.)

| Word-function Code | Total Number | Number Identified | Percent Correct |
|---|---|---|---|
| NIO | 0 | 0 | n/a |
| CNIO | 0 | 0 | n/a |
| PNIO | 0 | 0 | n/a |
| SAP | 1 | 1 | 100% |
| DOAP | 0 | 0 | n/a |
| IOAP | 0 | 0 | n/a |
| PNAP | 0 | 0 | n/a |
| OPAP | 0 | 0 | n/a |
| PAR | 2 | 1 | 50% |
| PAC | 0 | 0 | n/a |
| GS | 0 | 0 | n/a |

E-GUMPP GRAMMAR MASTERY TEST RESULTS FOR Guest User
I. Word-function identification (cont.)

| Word-function Code | Total Number | Number Identified | Percent Correct |
|---|---|---|---|
| GDO | 1 | 1 | 100% |
| GIO | 0 | 0 | n/a |
| GOP | 1 | 0 | 0% |
| GPN | 1 | 1 | 100% |
| GNC | 1 | 1 | 100% |
| IS | 0 | 0 | n/a |
| IDO | 2 | 0 | 0% |
| IPN | 2 | 2 | 100% |
| IAJ | 0 | 0 | n/a |
| IAV | 2 | 0 | 0% |
| IFC | 1 | 1 | 100% |

E-GUMPP GRAMMAR MASTERY TEST RESULTS FOR Guest User
I. Word-function identification (cont.)

| Word-function Code | Total Number | Number Identified | Percent Correct |
|---|---|---|---|
| CC | 4 | 4 | 100% |
| CORD | 2 | 2 | 100% |
| SC | 3 | 1 | 33% |
| CSC | 5 | 5 | 100% |
| RPS | 2 | 2 | 100% |
| RPDO | 2 | 2 | 100% |
| RPIO | 0 | 0 | n/a |
| RPPN | 0 | 0 | n/a |
| RPAJ | 1 | 1 | 100% |
| Results | 253 | 234 | 92% |

E-GUMPP GRAMMAR MASTERY TEST RESULTS FOR Guest User
II. Clause Identification

| Clause-Identification Code | Total Number | Number Identified | Percent Correct |
|---|---|---|---|
| IDC | 158 | 156 | 98% |
| IDC-2 | 35 | 35 | 100% |
| AVC | 18 | 13 | 72% |
| AJC | 18 | 18 | 100% |
| NCS | 8 | 3 | 37% |
| NCDO | 8 | 0 | 0% |
| NCPN | 6 | 0 | 0% |
| NCIO | 0 | 0 | n/a |
| NCOP | 2 | 2 | 100% |
| Results | 253 | 227 | 89% |

E-GUMPP GRAMMAR MASTERY TEST RESULTS FOR Guest User
III. Sentence Identification

| Sentence Type Code | Total Number | Number Identified | Percent Correct |
|---|---|---|---|
| Simple | 11 | 11 | 100% |
| Complex | 9 | 8 | 88% |
| Compound | 2 | 2 | 100% |
| Compound-Complex | 3 | 3 | 100% |
| Results | 25 | 24 | 96% |

Figure 14

COMPUTER-BASED EDUCATIONAL LEARNING

FIELD OF THE INVENTION

The present invention relates generally to the use of computer programs to aid in the teaching of students and to test their abilities. More particularly, the invention is directed to a system which provides the student with the basic foundation in complex subject matters and enables them to gain a proficiency in subjects such as grammar and the like.

DESCRIPTION OF THE PRIOR ART

Many types of educational software are available on the market. One of the initial and current uses for software in the educational industry is for computerized evaluation of standardized tests taken by school children using paper forms. During the test, children record their answers on a form which is collected and sent to the central agency. The answers are scanned into a computer and graded by the computer. A standard report is then generated and distributed to each student. These reports measure a student's comparative performance against others in a defined geographic region. One such test of this type is known as the Scholastic Aptitude Test (SAT). These tests provide instructors, parents, and students with an evaluative, reliable comparison as to how a student is performing versus his/her peers. However, these tests do not teach a student; they merely test the current knowledge of a student.

Another type of educational software runs on a network mainframe and terminal system for large scale simultaneous testing of groups of students at fixed locations. The software retains scores in a local database which allows an instructor to ensure that all students have achieved a certain minimum level of expertise in the subject. If an instructor determines that particular students require more help to obtain a level of competence, the instructor may tutor the students to bring them up to an acceptable level of competence in the subject. Therefore, this type of testing can be used as a tool by the instructor to ensure that all students have reached a particular level of competence before moving on to the next area of study. However, the software does not provide the instructor the means to increase the competence of the students; it merely identifies that a problem exists.

Other educational software exists for home use. Many educational programs are designed to be entertaining, with built-in tests being played as games. Games such as Where in the World is Carmen San Diego present students/players with a series of increasingly difficult tests of puzzles, wherein players must correctly solve the present round before they are allowed to continue to the next round of play. This type of software is reasonably well suited to informal isolated learning, but it lacks the comprehensive data collection features needed for formal test administration.

In light of the prior art, it would be beneficial to provide a computerized learning method which not only tests the skills of individuals and rates them accordingly, but also provides the means to teach the individual and increase his/her proficiency in a subject. This is particularly true in the area of grammar.

Various educational programs are known to teach students the fundamentals of grammar. However, while these programs may be effective, it is difficult to adapt these programs for use with the computer. One such program is entitled Business English Essentials: Grammar, Mechanics, and Usage Review. In this program, a reference manual and an accompanying workbook are utilized. A student must first study a series of "Points to Remember" or "Rules to Follow" pertaining to English grammar, usage, or mechanics found in the reference manual and then he/she must complete the appropriate exercises in the workbook. All exercises are completed by utilizing paper and pencil. Consequently, the student is not provided with automatic feedback. The ultimate learning objective of these exercises is for the student to learn to identify how each word and each group of words functions in all types of sentences reviewed. Each exercise consists of 25 sentences. Using a defined coding system, the student learns how each word and each group of words functions in a sentence. As the student progresses through the lessons, each new lesson introduces new functions for words or groups of words. This progression continues until all of the functions of words and groups of words found in a sentence are learned. While this conventional method of learning has proven beneficial, it does not guarantee that the student will have mastered all of the word-function concepts for words and groups of words. A student may progress in his/her lessons without realizing that a problem in his/her understanding of a particular concept exists. Problems may not be detected until the student completes a review exercise graded by the instructor. As these review exercises are not performed after each lesson and as it is difficult to analyze a student's answers, the feedback from these review exercises is less than ideal. If a student has performed poorly, there is no simple method to determine which concepts a student does not clearly understand or how best to tutor the student. This can be frustrating to the student, as no focused instruction can be provided due to the inability not to be able to properly analyze data.

This type of problem is particularly evident in the teaching of English grammar as well as other subjects that do not lend themselves to being adaptive for use with computers, since computers are numerically based. Consequently, it would be beneficial if a system could be developed to allow these types of subjects to be made adaptive for use with computers and computer programs.

SUMMARY OF THE INVENTION

The invention is directed to a computer program for educational testing. The program is comprised of one or more lessons to test a student's skills relative to a particular subject. In order to accomplish this, a database is provided in which non-numeric information is stored. The information is coded using numeric coding, such that the numeric coding is configured to allow a computer to search the non-numeric information. A guide for identifying the appropriate numeric code for each respective lesson is provided whereby as a student progresses through the lessons, the computer searches the database to provide the appropriate information to the student based upon the numeric code of the information and the guide for the respective lesson.

Another aspect of the invention is directed to a method of coding answers to a test given with the use of a computer program. Answers given by a student are compared to the correct answers located in a computer database. The program visually indicates correct answers in a first color and incorrect answers in a second color, whereby the color coding of the answers provides an easily detectable and effective means for the student and an instructor to recognize any problems the user may be having in determining the correct answers.

Another aspect of the invention is directed to a method of coding sentences for use in an educational computer program to teach grammar. In this method, a numeric code is created for each word function that can be used in a sentence. A respective sentence is reviewed to determine how each word functions in the structure of the sentence. Once reviewed, an appropriate numeric code is assigned to each respective word function used in the sentence, with the numeric code being entered into a database. The numeric code can be read and searched by the computer to allow the computer to recall appropriate sentences for each lesson in the education computer program.

The invention is also directed to a method of teaching grammar using a computer program. Appropriate sentences are generated for each lesson from a database of sentences. A student is asked to identify the word function of respective words provided in a respective sentence. The student's answers are compared to the correct answers located in the computer database. The computer indicates correct answers in a first manner and incorrect answers in a second manner, thereby allowing the student to review the results and modify the incorrect answers. The modified answers will be compared to the correct answers and the correct modified answers will be indicated in a third manner.

BRIEF DESCRIPTION OF THE DRAWINGS

FIG. 3 illustrates an exemplary content of a screen provided in the Tutorial Instructions section of the program.

FIG. 4 illustrates an exemplary content of a first screen provided in the Tutorial Exercise section of the program.

FIG. 5 illustrates an exemplary coding key for sentences provided for a Tutorial Exercise section of the program.

FIG. 6 illustrates an exemplary content of a first screen provided in a Practice to Mastery section of the program.

FIG. 7 illustrates an exemplary coding key for coding words, clauses, and sentences for use with the program.

FIG. 8 illustrates an exemplary key for ensuring that only appropriate sentences are provided for respective lessons in the Practice to Mastery section.

FIG. 9 illustrates an exemplary progression of the total and types of codes required for each lesson.

FIG. 11 illustrates an exemplary content of a possible second screen provided in a Practice to Mastery section of the program.

FIG. 12 illustrates an exemplary content of a possible third screen provided in a Practice to Mastery section of the program.

FIG. 13 illustrates an exemplary content of a screen of a student's Progress Review.

FIG. 14 illustrates an exemplary content of a student's printout of a calculated summary of responses to a Grammar Mastery Test.

DETAILED DESCRIPTION OF THE DRAWINGS

Figure 1:
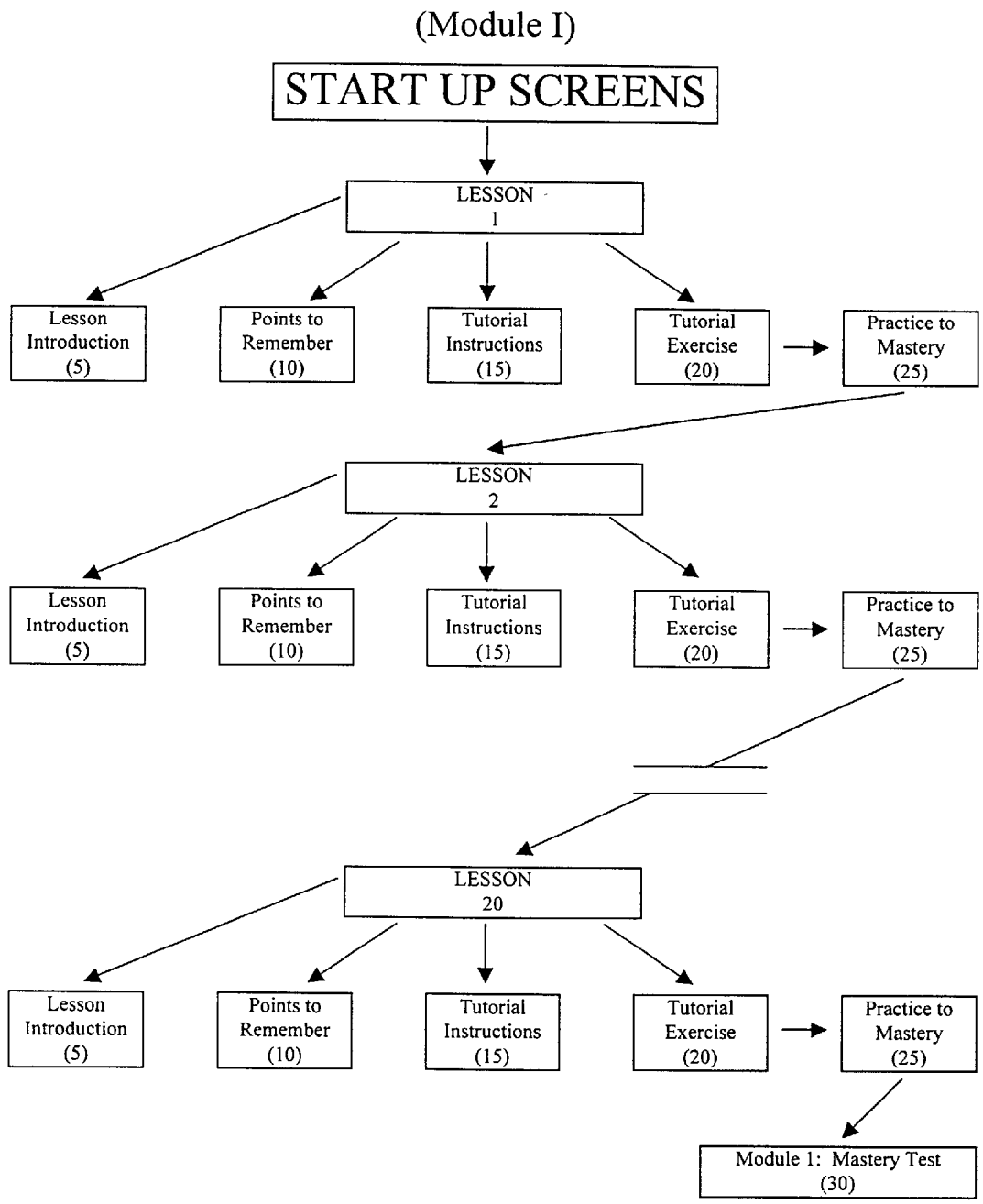
FIG. 1 illustrates an overview of a first computer module of the Electronic Grammar, Usage, Mechanics Proficiency Program described herein.

The object of the disclosed embodiment of the invention is to increase a student's proficiency in English grammar, usage, and mechanics. By utilizing the system described herein and illustrated in the drawings, students may progress through the program at their own pace, taking as much time as is required to master the lesson at each level. The student's proficiency at each level is assured, as no student can progress to the next level until he/she is able to demonstrate mastery of the current level. In so doing, the program and method described ensures that each student will have a solid, basic understanding of grammar, usage, and mechanics at the completion of the program.

The Electronic Grammar, Usage, Mechanics Proficiency Program (E-GUMPP) described is operated by utilizing a computer. The program is delivered to the student by means of a disk, CD-ROM, Internet, or any other means for delivery of a computer program to an individual. As shown in FIG. 1, the E-GUMPP Module I has 20 lessons, with each lesson having five sections: Lesson Introduction section 5, Points to Remember section 10, Tutorial Instructions section 15, Tutorial Exercise section 20, and Practice to Mastery section 25. Also included is a Module I: Mastery Test section 30 at the conclusion of the first module. Each of these sections will be described more fully with reference to the drawings and the illustrative embodiment shown therein.

Figure 2:
FIG. 2 illustrates an exemplary content of a screen provided in the Points to Remember section of the program.

The Lesson Introduction section 5 provides a brief introduction to the respective lesson. The Points to Remember section 10 is comprised of various screens, each of which identifies a particular key rule or fact that the student must know and understand at the completion of the particular lesson. As shown in FIG. 2, each screen has one rule or fact 12 presented for the student's review. Examples 14 are also provided to facilitate the student's understanding. The number of Points to Remember screens varies according to the lesson and how many points/rules are involved.

Brief instructions on how to complete a Tutorial Exercise section 20 are provided in the Tutorial Instructions section 15. FIG. 3 shows the Tutorial Instructions for Lesson 1. After the student reads and understands the instructions, the student activates button 21 to display the first sentence of the Tutorial Exercise section 20. The Tutorial Exercise section 20 allows the student to practice applying the rules provided in the Points to Remember section 10. A series of sentences with specific coding instructions is presented, which the student completes in sequence. The student must respond correctly to each instruction and complete all instructions before the next sentence will appear. This will be discussed in more detail below. In the embodiment described herein, the Tutorial Exercise section 20 consists of a series of 25 sentences. As illustrated in FIG. 4, each Tutorial Exercise screen has a selection menu 22 which is comprised of grammar function tabs and a number of codes specifically related to each grammar function, a sentence that must be coded 24, and a coding instruction 26. Also, some screens include a tutorial aid 28. The coding instruction 26 tells the student which specific word(s) is to be coded in the sentence before the student may move on to the next instruction. The tutorial aid 28 provides additional information which may prove to be helpful to the student. This tutorial aid may be voice activated. The sentence 24 and the selection menu 22 are the means for allowing the student to practice his/her understanding of the Points to Remember of the current lesson as well as those for all previous lessons. The selection menu 22 is tailored for each lesson and continually expands as more information is provided in the Points to Remember. In the example shown, the selection menu 22 offers two choices for a noun subject; however, in later lessons, the menu is expanded to offer a total of seven choices for a noun subject. In the embodiment described herein, a different screen appears for each type of word function to be identified. In other words, once the subject is correctly identified, the screen, including the coding instruction 26 and selection menu 22, will change to focus on the identification of the verb. Screens with new coding instructions and the selection menu focusing on other parts of speech continue to appear until all required word functions in a sentence are correctly coded.

The sentences used in the Tutorial Exercise section 20 are pre-selected with all students viewing the same sentences. This allows an instructor the option to present the concepts of the lesson to all students at once, if so desired. As the purpose of the Tutorial Exercise section 20 is to teach rather than test, the sentences are selected to optimize the student's learning. Only sentences comprised of words and groups of words that are functioning like the concept(s) presented in the current lesson or a previous lesson meet the criteria as a sentence for a specific lesson. FIG. 5 illustrates the procedure used to select sentences for Lesson 5. As shown, each sentence 1–25 of Lesson 5 has an established set of criteria which must be met. The criteria is established to facilitate the student's understanding of the particular lesson. Similar coding criteria was established for each lesson.

As the lessons progress, the Tutorial Exercise section 20 not only teaches the student the Points to Remember for that lesson, but also reinforces the Points to Remember from previous lessons. Therefore, as the student must continually use the building blocks from previous lessons as he/she advances, the lessons and rules become more firmly etched in the mind of the student.

After a student completes the Tutorial Exercise section 20, he/she then progresses to the Practice to Mastery section 25. The Practice to Mastery section 25 tests the student's proficiency of the rules taught in the Points to Remember section 10 of the particular lesson and all previous lessons. A series of randomly selected sentences is presented to the student to test his/her knowledge. Appropriately coded sentences are selected and will be more fully discussed below. The screens in the Practice to Mastery section 25 have many similarities to the initial screen of the Tutorial Exercise section 20. As shown in FIG. 6, each initial screen has a selection menu 32, a sentence 34, and an instruction 36. A series of buttons 40, 41, 42, 43, 44, and 45 is also provided. The instruction 36 provides the student with coding instructions relative to the particular screen. The sentence 34 and the selection menus 32 are provided to test the student's understanding of the Points to Remember for that particular section as well as the Points to Remember for all previous lessons. Therefore, the Practice to Mastery section 25 tests not only the knowledge acquired in the current lesson, but also the knowledge acquired in all previous lessons. Similar to the Tutorial Exercise section 20, the function choices within the selection menu 32 expand as the lessons progress. A more detailed description of the operation of the system and program will be provided below.

When using the Practice to Master section 25, sentences are selected randomly within certain guidelines or parameters from a database of sentences. In order to facilitate the selection of the sentences by the computer, it is essential that the sentences be coded in a manner to allow the computer to analyze and select the appropriate sentences. In order to accomplish this, each word in every sentence is assigned a number. The number assigned to each word is dependent on the use of the word in each respective sentence. FIG. 7 indicates the appropriate word-function number code to be assigned according to the usage of the word. For example, if a word is used as a noun subject, it is assigned the word-function number code of 1. If the word is used as a gerund complement, it is assigned the number 41. The word-function coding of each sentence is entered into and stored in the computer. The type of sentence is also coded using letters rather than numbers, as identified in FIG. 7. It should be noted that other types of coding schemes may be used without departing from the scope of the invention.

With each sentence of the database properly coded, the computer can generate appropriate sentences for each lesson. As an example, if the student is working on Lesson 12 relating to gerunds, the computer must select sentences that include a word-function number code of 36, 37, 38, 39, or 40, as illustrated in FIG. 8. However, to facilitate the student's understanding, the sentence should not have a word-function number code greater than 41 and should have a sentence code of A. In other words, if the student has progressed to Lesson 12, in which gerunds and gerund phrases are to be identified, each sentence generated by the computer must be a simple sentence and contain either a gerund subject, gerund direct object, gerund indirect object, gerund object of a preposition, or a gerund predicate nominative 36, 37, 38, 39, or 40 to be identified. If a sentence in Lesson 12 did not have any of the listed words, the sentence would not be meaningful in the lesson, as the student would not get the exposure to the type of word function learned in the lesson. It is also important that the student not become needlessly frustrated when learning the material. This would occur if a word-function concept appeared in a sentence before it was explained in a Points to Remember section. Therefore, each lesson has a maximum word-function code number for the sentences. Referring to Lesson 12, no sentence can have a word-function code number greater than 41. In practical terms, when learning about gerunds in Lesson 12, no sentences used in the lesson will have infinitive subjects, correlative conjunctions, adjective clauses, or the like. As the student has not yet learned of these concepts in Lesson 12, sentences containing these types of words are avoided. Utilizing these defined coded parameters, the computer can search the database of coded sentences and select sentences which meet the parameters, thereby enabling the generation of appropriate sentences for each lesson.

As previously discussed, as the lessons progress, the selection menu 22 of the Tutorial Exercise section 20 and the selection menu 32 of the Practice to Mastery section 30 change to include the various options available to the student. It is worth noting that the Tutorial Exercise section 20 and the Practice to Mastery section 30 for any given lesson have the same selection menu 22, 32. However, as the selection menus are designed to be used by people rather than computers, it is beneficial for the selection menus to use words and alphabetic codes for each word rather than numeric codes. As the human brain more readily recognizes alphabetic codes, each function of a word is assigned an alphabetic code. FIG. 7 indicates the appropriate word-function code number and the corresponding word-function alphabetic code assigned to each usage of the words.

FIG. 9 illustrates how the selection menu changes for each lesson. For Lesson 1, the selection menu would have only two selections: NS and CNS. However, for Lesson 5, the selection menu would have the following options: NS, CNS, PNS, PNU, MV, HV, MVT, MVI, NDO, CNDO, PNDO, AJ, and CAJ. Consequently, as more information is taught to the student, the selection menu 22, 32 must expand to provide all appropriate options. Whether all of the options shown for Lesson 5 are displayed in one menu or in more than one menu using various drop-down boxes is an insignificant change with respect to the invention. Therefore, the term selection menu 22, 32 will be used to describe any manner in which the options are displayed.

In use, the student logs on to a system to access the E-GUMPP program provided on a CD-ROM or the like. Each student has an individual identification and password which must be properly entered before the student can access the contents program. The use of the student identification and password allows the computer to keep track of each student's progress, thereby allowing each student to progress at his/her own pace. Each student may also have an individual disk on which the student's progress is recorded. However, as this process of teaching can utilize the Internet, as well as individual personal computers, the use of a disk is not required in all circumstances.

The first time the student logs on, he/she is exposed to introductory screens in which the overall program is explained in a summary fashion. A Help menu is also available. When the student clicks on the Help button, it provides information regarding the following: (1) buttons at the top of the screen, (2) Tutorial Exercise procedures, (3) Practice to Mastery procedures, and (4) an explanation of the Mastery Test. A reference manual comprised of the Points to Remember and Rules to Follow is also provided as a resource for the student. After the student has reviewed the introductory screens, the introduction to Lesson 1 screen will appear. After the student reviews this screen, the Points to Remember section 10 is shown. As previously discussed, the Points to Remember section is comprised of rules/points that the student must read and understand before attempting the Tutorial Exercise section 20. The student can spend as much time reviewing this information as required. This information can be retrieved at any time while the student is completing a Tutorial Exercise section.

Figure 10:
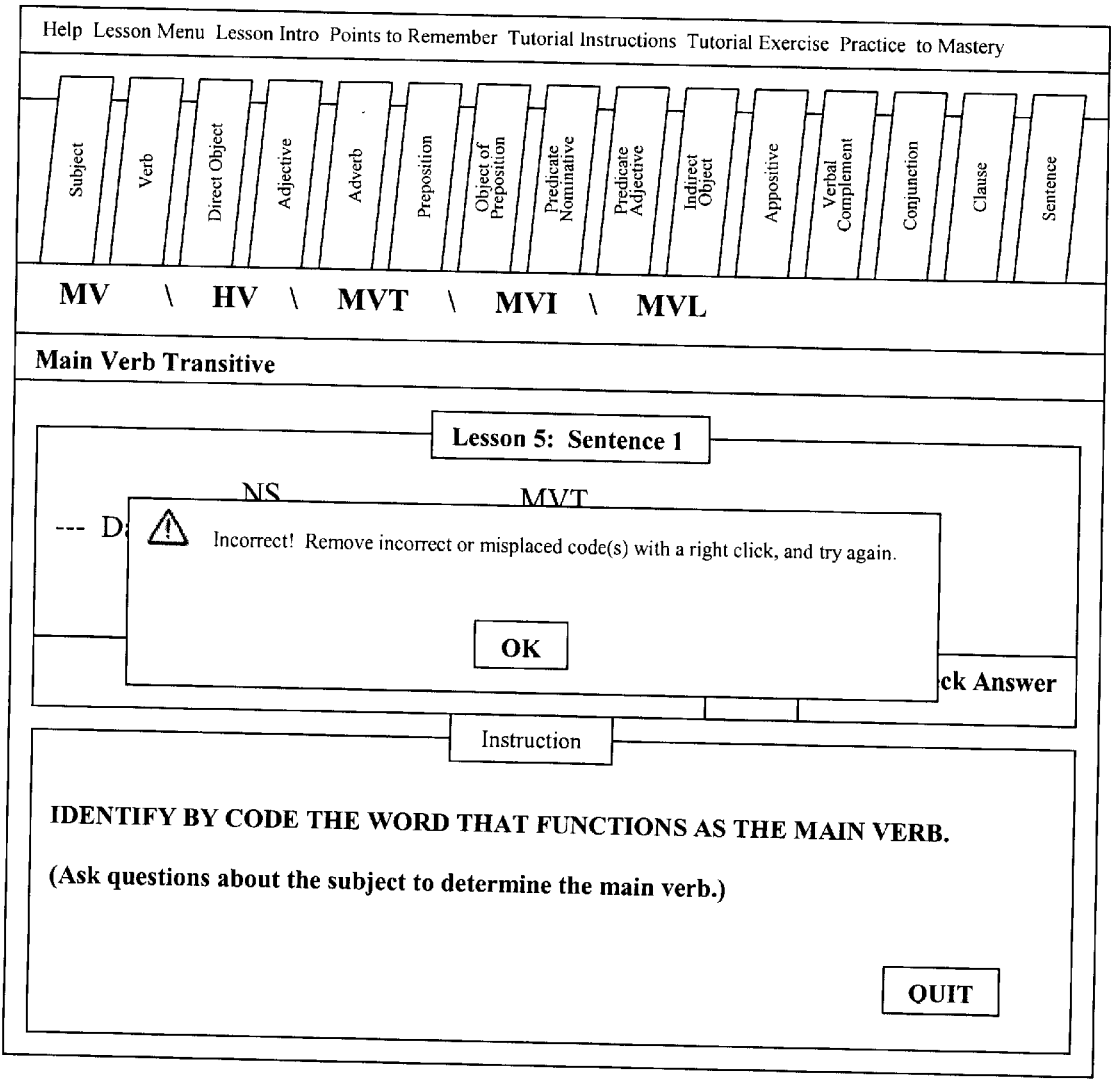
FIG. 10 illustrates an exemplary content of a screen indicating an incorrect response provided in the Tutorial Exercise section of the program.

After the student understands the Points to Remember section 10, the student reviews the Tutorial Instruction section 15 and then completes the Tutorial Exercise section 20. An initial screen is displayed (see FIG. 4). The student must read the coding instruction 26 and perform the task indicated by the coding instruction. Assuming that the sentence to be coded is "The new secretary has a pleasant disposition." and assuming that this sentence appears in the Tutorial Exercise section 20 for Lesson 1 shown, the student must identify and code the word(s) that functions as the subject. The tutorial aid 28 provides the student with additional guidance. The student examines the sentence 24 and determines which word(s) functions as the subject of the sentence. Once the student has determined which word(s) functions as the subject, the student directs the cursor to the selection menu 22 and clicks on the choice he/she believes is correct. In this example, as the word secretary is a noun subject, the students clicks on the tab labeled NS. It is worth noting that if the student does not remember what NS stands for, he/she can cause a "roll-over" text to be shown indicating the NS stands for a noun subject. This applies for any code available in the selection menu 22. After the student has clicked on the NS tab, the student moves the cursor to the word in the sentence he/she has identified as the noun subject. In this example, the student would position the cursor over the word secretary and a hand would appear. Then the student is to click the mouse, causing the code NS to appear above the word. When the student feels as though he/she has accomplished the task described by the coding instruction, the student is to click the "Check Answer" button 29. This causes the computer to check the student's input relative to the correct answer. If the student has provided the correct answer to the coding instruction requested, the message "Well Done" is displayed along with a button that the student is to click on to proceed to the next sentence; then the same procedures are repeated with the next sentence. However, any time a student does not provide a correct answer to a coding instruction, the computer does not allow the student to advance. Instead, the computer provides the message: "Incorrect! Remove incorrect or misplaced code(s) with a right click, and try again." (See FIG. 10). The student must then change the code(s) in an attempt to provide the proper answer. After the new code(s) has been entered, the student again activates the "Check Answer" button 29. If the code(s) is correct, the student proceeds to the next sentence. However, if a mistake still exists, the student must continue to place a code(s) over a word(s) until the correct code(s) is placed over the proper word(s). This ensures that the student cannot proceed until he/she understands the word-function concept.

The operational procedures described in the preceding paragraph apply to the tutorial section of each respective lesson. However, as the lessons progress and as the student must identify more word functions in a sentence, it would be impractical to place codes over each word at the same time and on the same screen. As the object of the tutorial section is to teach, the student is asked to identify each type of word function on separate screens. This also allows the appropriate message and in some cases a tutorial aid to be displayed. As an example, in Lesson 3, the tutorial sentence "Many local residents reacted to the new zoning laws." may appear. The student is first asked to identify the word(s) that functions as the subject. Using the operational procedures described above, the student places the "NS" code over the word residents and clicks the "Check Answer" button. As the answer was correct, the student is then asked to identify the word that functions as the main verb. As this occurs, the screen depicts an appropriate tutorial aid, which may be voice-activated, and the appropriate selection menu items are highlighted. The student selects the code "MV" and places it over the word reacted. The student clicks the "Check Answer" button. As the answer was correct, the program displays the next screen which asks for the total number of helping verbs. The number "0" is selected and the "Check Answer" is again depressed. As the answer was correct, a "Well Done" is displayed along with a button to proceed to the next sentence. If any answer had been incorrect, the program would not have allowed the next screen to be displayed. Instead, the student would have been prompted to try again. As is evident from the above description, the number of screens provided for each sentence is increased as the complexity of the lessons increases. The student cannot bypass difficult words by not coding them, as the computer will not allow the student to proceed until all required words in a sentence are correctly identified.

Without the use of computers and computer programs, this method of teaching is not practical. Prior to this invention, students would be required to do tutorial exercises on paper. Consequently, the students would not get instantaneous feedback as they progressed. Also, as the feedback was not instantaneous, the student could continue without truly understanding the rules of each lesson. Therefore, the Tutorial Exercise section of the present invention provides a much more effective method of teaching students grammar than was previously available.

During the Points to Remember section 10 and the Tutorial Exercise section 20, the student progresses at his/her own pace, and the objective of these sections is to provide the student with a solid foundation of the rules provided in that lesson. Consequently, students can review the Points to Remember and practice the tutorial sentences as many times as they feel is needed. In order to test this information and ensure that the student has a sufficient understanding of the teachings of the lesson, the student must complete the Practice to Mastery section 25.

After the student has completed the Tutorial Exercise section 20 for a respective lesson, he/she can move on to the Practice to Mastery section 25. FIG. 6 is an initial screen for the Practice to Mastery 25 for Lesson 5. For this exercise, the student must read the instruction 36 on the screen and perform the task indicated by the instruction. As the instruction reads: "IDENTIFY BY WORD-FUNCTION CODE HOW EACH WORD FUNCTIONS IN THIS SENTENCE, AND THEN CLICK THE "GRADE ME" BUTTON", the student is to place codes above each word in the sentence 34 that reads: "Counselors offer beneficial information." The student examines the sentence 34 and determines which word(s) functions as the subject of the sentence. Once the student has determined which word(s) functions as the subject, the student directs his/her cursor to the selection menu 32 and clicks on the subject tab, which causes a submenu to be displayed. In this example the submenu displays NS for noun subject, CNS for compound-word noun subject, PNS for pronoun subject, and PNU for pronoun subject understood. The student clicks on the choice he/she believes is correct. The student clicks on the tab labeled NS. If the student does not remember what NS stands for, he/she can move the cursor to the tab so that a description indicating that NS stands for "noun subject" will be displayed. This applies for any code in the selection menu 32. After the student has clicked on the NS tab, the student moves the cursor to the word(s) in the sentence he/she has identified as the noun subject. In this example, the student would respectively position the cursor over the word Counselors and click accordingly, causing the NS code to appear above the word. This process is repeated for each word in the sentence using the verb code MVT for the word offer, the adjective code AJ for the word beneficial, and the direct object code NDO for the word information. Once the student has placed codes above each word in the sentence, he/she is to click the "Grade Me" button 40. This causes the computer to check the student's input relative to the correct answer. If the student has properly identified all of the word functions requested, the codes placed above each word will then change from black to green to indicate that the answers are correct. The student can then progress to the next sentence in the Practice to Mastery section 25 by clicking the "New Sentence" button 41. However, if the student has not identified all the required word functions correctly on his/her first attempt, the computer does not allow the student to advance. Instead, the computer identifies all incorrect answers by changing incorrect codes to red. FIG. 11 indicates a possible second screen for a Practice to Mastery exercise with green codes above words correctly identified and a red code above a word incorrectly identified. The instruction that appears in the instruction box 36 reads as follows: "YOU HAVE NOT IDENTIFIED ALL WORDS. GREEN CODES ARE CORRECT RESPONSES, AND RED CODES ARE INCORRECT RESPONSES. REMOVE RED CODES WITH A RIGHT CLICK, AND TRY AGAIN." After replacement codes have been entered, the student again activates the "Grade Me" button 40. The new codes entered by the student will be displayed in black. If these new codes entered by the student are correct, the new codes will change from black to yellow to indicate that the answers are correct on the second attempt. If a code above a word is still incorrect after the second attempt, the computer will enter the correct code in red above the respective word to allow the student to learn the correct answer. (To reiterate, the color green indicates a correct answer on the student's first attempt, the color yellow indicates a correct answer on the student's second attempt, and the color red indicates a student's failure to provide a correct answer.) This color coding of the function codes provides an easy and effective manner to communicate the results to the student and the instructor. Problems with identifying specific word-functions can more easily be recognized. For example, if a student consistently misidentifies words that function as participles, the student and/or instructor can recognize the problem and know exactly what components of which lesson must be reviewed to acquire mastery. FIG. 12 illustrates an exemplary content of a possible third screen provided in a Practice to Mastery section 25 of the program. This screen illustrates words in a sentence coded green, yellow, and red.

At any time during the Practice to Mastery section 25, the student may click the "Progress Review" button 45 to view his/her progress. FIG. 13 is a sample screen of a Progress Review. The Progress Review summarizes a student's current progress within a Practice to Mastery exercise. The review states the current number of total attempts, number of correct first attempts, number of correct second attempts, number of sentences with words not identified, and consecutive number of correct first attempts. Also, the review states the required goal that the student must achieve in order to move on to the next lesson. The goal states: "Your goal is to correctly identify (on your first attempt) how all words function in 25 sentences with 10 consecutive first-attempt responses in a row." The Progress Review provides both the student and the instructor an opportunity to review a student's current progress at any time. Also, the number of first attempts and the number of consecutive first attempts are always provided on the bottom of the screen, as shown in FIG. 6, for easy reference.

After each 15 sentences a student attempts, a student's Progress Review automatically appears on the screen. At this time the "Review" button 42, the "Back" button 43, and the "Forward" button 44 are automatically activated. When the "Review" button 42 is clicked on by the student or instructor, the student and/or instructor can review all previously coded sentences in the Practice to Mastery exercise by depressing the "Forward" button 44 or the "Back" button 43. As previously described, the word codes are color coded. This method makes it easy to identify problem areas for each student. The "Review" button 42 can be activated at various times, according to the particular desires of the programmer, which is governed by the needs of the instructor and the student.

The Practice to Mastery section is completed when the student correctly identifies 25 sentences correctly on his/her first attempt with the last 10 sentences completed correctly on the first attempt. This goal/requirement can vary depending on the circumstances. However, the student cannot vary the goal/requirement.

As the student progresses with the Practice to Mastery section, the computer keeps track of his/her progress. If after 45 attempts a student does not achieve the required goal of the Practice to Mastery exercise, the computer will provide a message to the student that he/she may not proceed without first consulting with the instructor. The program will effectively prevent any further input from the student until the instructor enters a password to allow the student to proceed. By doing so, the student is foreclosed from proceeding until he/she has obtained help from the instructor, thereby ensuring that the student has mastered each lesson before being allowed to proceed. If, on the other hand, the student does successfully achieve the required goal by satisfactorily completing the lesson, the computer will acknowledge the accomplishment and so indicate to the student. This acknowledgment can be in any form, but in order to keep the attention of the student and make the learning more fun, the acknowledgment can be in the form of a cartoon character or other types of animation praising the student for his/her accomplishment.

As the student progresses through the lessons, the methodology described herein is repeated. The Points to Remember section is reviewed, the Tutorial Exercise section is completed, and the Practice to Mastery section is completed. The example described above with reference to Lesson 1 is therefore representative of the method used in all lessons. However, as Lesson 1 is the first lesson, the example is relatively simplistic, as the student must identify only one type of word function—the subject. As the lessons progress, the student must identify more than just one word function; he/she must identify all functions previously learned. Therefore, by Lesson 5 the student must identify the function of every word in the sentence. In the last few lessons, the same techniques are used but the lessons are further expanded. In addition to identifying how all words function in a sentence, the student must identify the number and types of clauses (i.e., adjective, adverb, or noun) and the type of sentence (i.e., simple, compound, complex, and compound-complex).

The sentences used in the Practice to Mastery section 25 are drawn from a large database of coded sentences. As the sentences are coded with numbers, as was earlier described, the computer will only display appropriate sentences. This allows every student to be working on different sentences, thereby ensuring that no student can copy answers from another. The use of a database of sentences also allows the lessons to be more meaningful and fun to the student. At the beginning of the program, the student can select from various topics of interest to the individual student. The computer can then select the sentences from the database that are directed to the student's interest. In so doing, the student can have fun, thereby stimulating his/her desire to learn.

The computer program allows the student to return to completed lessons to review the Points to Remember section 10 or any other section of the lesson. This is accomplished with pull-down menus or any other means used to allow computer users to go from one section to another. The ability to go back and review can be extremely beneficial to the student. As previously discussed, as the student codes sentences, patterns of mistakes will become obvious to the student. Once the student realizes his/her mistakes, the student can go back and review the appropriate lesson, particularly the Points to Remember section. This prevents the student from becoming overly frustrated.

Once all lessons of a module are completed, a Mastery Test is available. The Mastery Test for the Grammar Module is comprised of 25 randomly selected sentences that are either simple, compound, complex, or compound-complex. For each sentence, the student is required to do three things: (1) Identify all words that comprise each independent clause and each dependent clause by placing the correct clause-identification code beneath each word in each sentence, (2) Identify the type of sentence as simple, compound, complex, or compound-complex, and (3) Identify how each word functions in a sentence by placing the correct word-function code above each word in each sentence. Once the student has completed the Mastery Test, the E-GUMPP program will provide a calculated summary of the student's responses. This printout can be studied by the student and/or instructor for specific deficiencies, and then the student can review the specific information in the lessons to correct the deficiencies. Since the Mastery Test is comprised of randomly selected sentences following a specific set of guidelines, multiple attempts of the Mastery Test may be taken until proficiency is achieved. FIG. 14 illustrates an exemplary content of a student's printout of a calculated summary of responses to a Grammar Mastery Test. At the completion of all three modules, a proficiency of grammar, usage, and mechanics certification test is available.

As previously noted, the use of computers and the computer programs of this invention allows this method of teaching grammar to be practical. This type of instantaneous feedback, the ability to utilize sentences which interest the student, the ability to quickly understand the student's problem areas, and the ability for students to progress at their own pace are all functions of the use of the computer program and methods of this invention. Prior to this invention, a student did not necessarily have to acquire a mastery of grammar in order to receive passing grades. With the use of the methods taught herein, the student is much more likely to have developed a thorough knowledge of grammar at the completion of the program. The use of the computer helps to direct and optimize the instructor's efforts. By utilizing the method described herein, the instructor can determine which students are struggling to understand the concepts. With this knowledge, the instructor can focus his/her efforts on the students that require more instruction, thereby maximizing the effectiveness of the instructor.

While the example used in this application is directed to the mastery of grammar, the method and system described herein can be used to teach various subjects. The coding scheme utilized in this illustration is not meant to be exhaustive; different coding schemes can be utilized without departing from the scope of the invention. The foregoing illustrates just some of the possibilities for practicing the invention. It is, therefore, intended that the foregoing description be regarded as illustrative rather than limiting, and that the scope of the invention is given by the appended claims together with their full range of equivalents.

What is claimed is:

1. A method of teaching grammar using a computer program, the method comprising the steps of:

selecting a lesson from a plurality of grammar lessons;

generating at least one appropriate sentence for the selected lesson;

displaying an appropriate sentence to a student;

asking the student to identify a word function of at least one word provided in the displayed appropriate sentence, wherein the word function to be identified corresponds to word functions associated with the selected grammar lesson;

comparing answers given by the student to correct answers;

indicating correct answers in a first manner and incorrect answers in a second manner;

asking the student to review the answers and modify the incorrect answers; and comparing the modified answers to the correct answers and indicating the correct modified answers in a third manner.

2. A method of teaching grammar as recited in claim 1 wherein the first manner is a first color, the second manner is a second color, and the third manner is a third color, whereby the colors associated with the answers provides an easily detectable and effective means for the student and an instructor to recognize any problems the student may be having in determining the correct answers.

3. A method of teaching grammar as recited in claim 1 wherein each sentence is coded by reviewing the sentence to determine how each word functions in the structure of the sentence, creating a numeric code for each word function that can be used in a sentence, assigning the appropriate numeric code to each respective word function used in the sentence, and entering the numeric code into a database, whereby the numeric code can be read and searched by a computer to allow the computer to recall appropriate sentences for each lesson.

4. The method of teaching grammar as recited in claim 3 wherein a numeric code guide is created for each lesson that gives the maximum and minimum numeric code that can be used for each lesson, the maximum and minimum numeric code for a respective sentence is compared to the maximum and minimum numeric code for the lesson to determine if the numeric codes found in the sentence are appropriate for the lesson, whereby if the numeric codes of the sentence are appropriate, the sentence is displayed and if the numeric codes of the sentence are not appropriate, the computer compares the maximum and minimum codes of further sentences until a sentence is found in which the numeric codes of the sentence are appropriate and the sentence is displayed.

5. The method of teaching grammar as recited in claim 1 wherein each word in each sentence is assigned a letter code based on the use of the word in the sentence.

6. The method of teaching grammar as recited in claim 5 wherein the letter codes available for a user to use are displayed in selection menu, the selection menu having explanations associated with the letter codes, whereby the user can access the explanations if the user so desires.

7. The method of teaching grammar as recited in claim 5 wherein one sentence at a time is provided on the screen for the user to work on, whereby the user must answer the question provided on the screen by properly identifying the function of the words identified by the question.

8. The method of teaching grammar as recited in claim 7 wherein after the user has attempted to identify all of the word functions required, the user will click a button and the computer will determine if all of the word functions were properly identified, whereby if all of the word functions are properly identified by the user, the computer will display the next sentence.

9. The method of teaching grammar as recited in claim 7 wherein after the user has attempted to identify all of the word functions required, the user will click a button and the computer will determine if all of the word functions were properly identified, whereby if not all of the word functions are properly identified by the user, the computer color codes the answers to distinguish the right answers from the wrong answers, allowing the user and an instructor to easily recognize any problems the user may be having.

10. A method of coding answers to a test given with the use of a computer program, the method comprising the steps of:
   a student providing answers to respective questions and indicating that all answers have been provided to initiate the method;
   comparing answers given by the student to the correct answers located in a computer database;
   visually indicating correct answers in a first color and incorrect answers in a second color;
   the student reviewing the results of the comparison and modifying the incorrect answers indicated by the second color, and upon completion the student indicating that all appropriate answers have been modified;
   comparing the student's modified answers to the correct answers located in the computer database;
   visually indicating correct answers in a third color and modified incorrect answers in the second color;
   whereby the color coding of the answers provides an easily detectable and effective means for the student and an instructor to recognize any problems the student may be having in determining the correct answers.

* * * * *